(No Model.) 3 Sheets—Sheet 1.
M. KELLY.
CLUTCH FOR BICYCLES.
No. 539,273. Patented May 14, 1895.
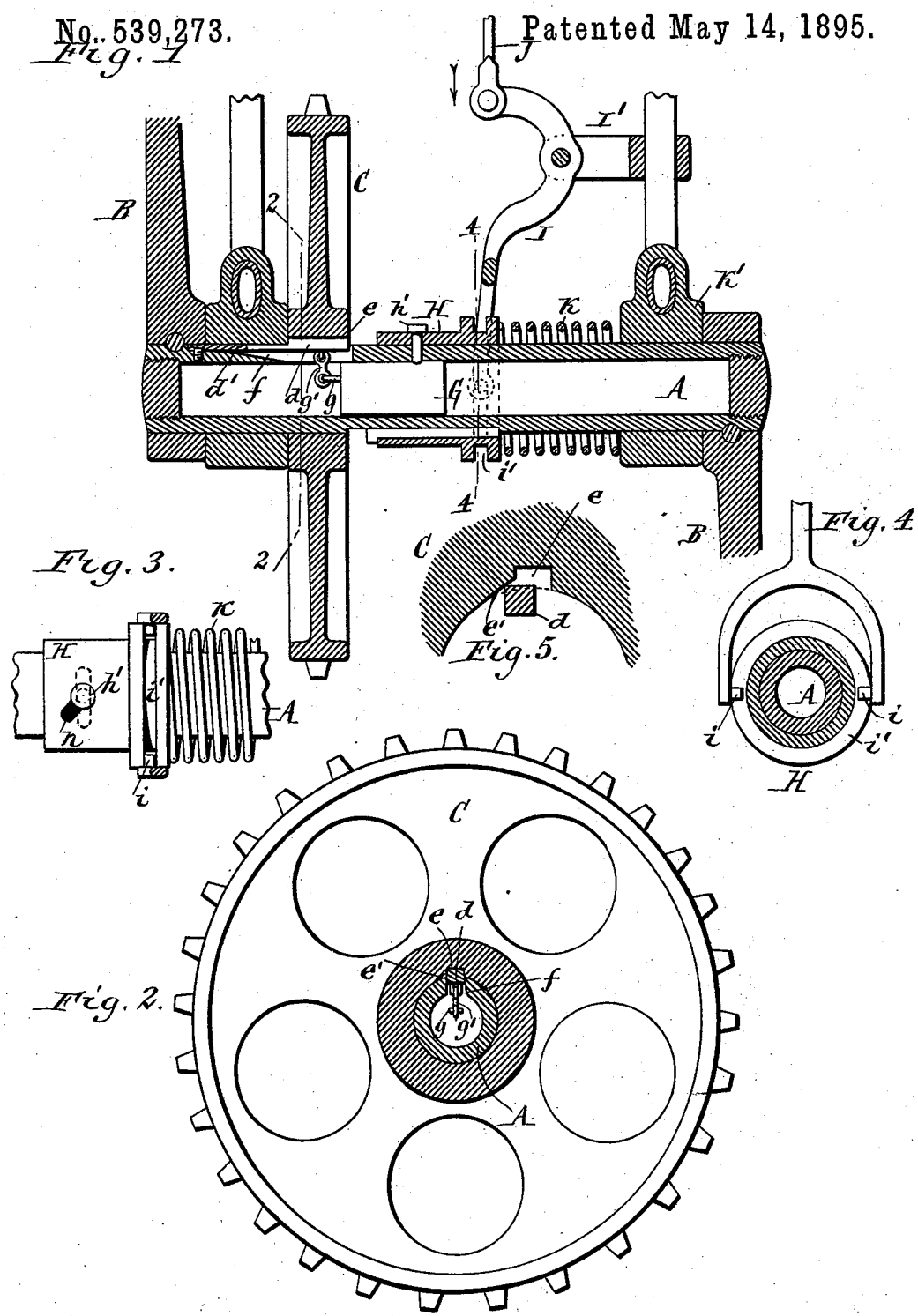
Witnesses:
Chas. F. Burkhardt.
Emil Neuhart
Michael Kelly Inventor.
By Wilhelm Bonner.
Attorneys (No Model.) 3 Sheets—Sheet 2.
M. KELLY.
CLUTCH FOR BICYCLES.

No. 539,273. Patented May 14, 1895.

Witnesses:
Chas. F. Burkhardt
Emil Neuhart

Michael Kelly
Inventor.
By Wilhelm Bonner Attorneys.

(No Model.) 3 Sheets—Sheet 3.
M. KELLY.
CLUTCH FOR BICYCLES.
No. 539,273. Patented May 14, 1895.
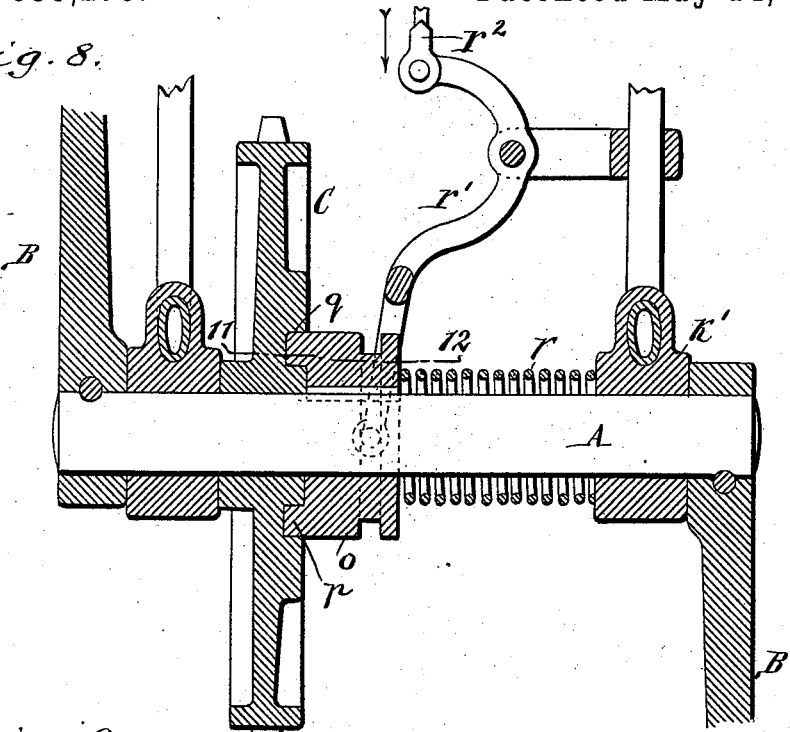
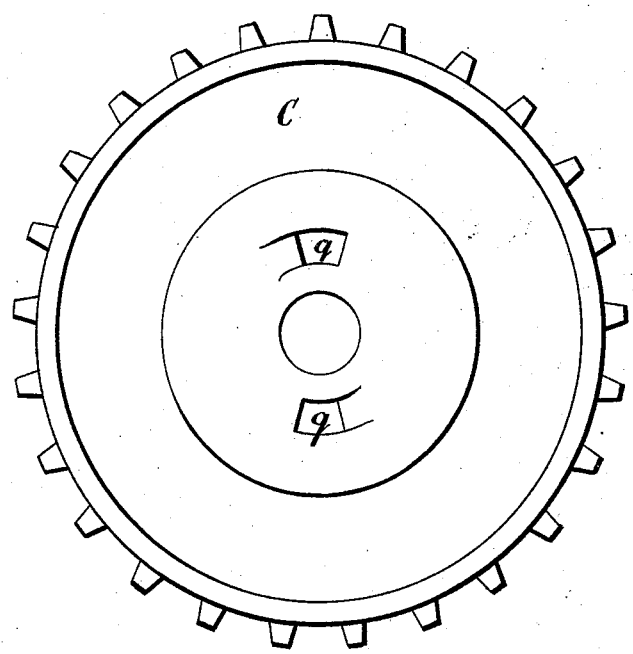
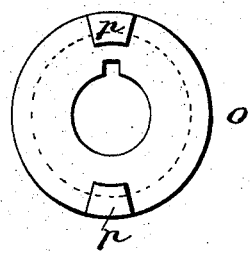
Witnesses:
Chas. F. Burkhardt
Emil Neuhart
Michael Kelly
Inventor
By Wilhelm Bonner
Attorneys
THE NORRIS PETERS CO., PHOTO-LITHO., WASHINGTON, D. C.

UNITED STATES PATENT OFFICE.

MICHAEL KELLY, OF BUFFALO, NEW YORK.

CLUTCH FOR BICYCLES.

SPECIFICATION forming part of Letters Patent No. 539,273, dated May 14, 1895.

Application filed March 31, 1893. Serial No. 468,550. (No model.)

*To all whom it may concern:*

Be it known that I, MICHAEL KELLY, a citizen of the United States, residing at Buffalo, in the county of Erie and State of New York, have invented new and useful Improvements in Clutches for Bicycles, &c., of which the following is a specification.

This invention relates to a clutch designed more especially for throwing the cranks of a bicycle or other velocipede into and out of gear with the driving axle, so that the cranks may be disconnected from the driving shaft in coasting, to permit the feet of the rider to remain at rest upon the cranks.

The object of my invention is to provide a clutch whereby the cranks, when the machine is in motion, may be thrown into gear with but a slight jar to the rider and with a minimum strain on the machine.

Figure 6:
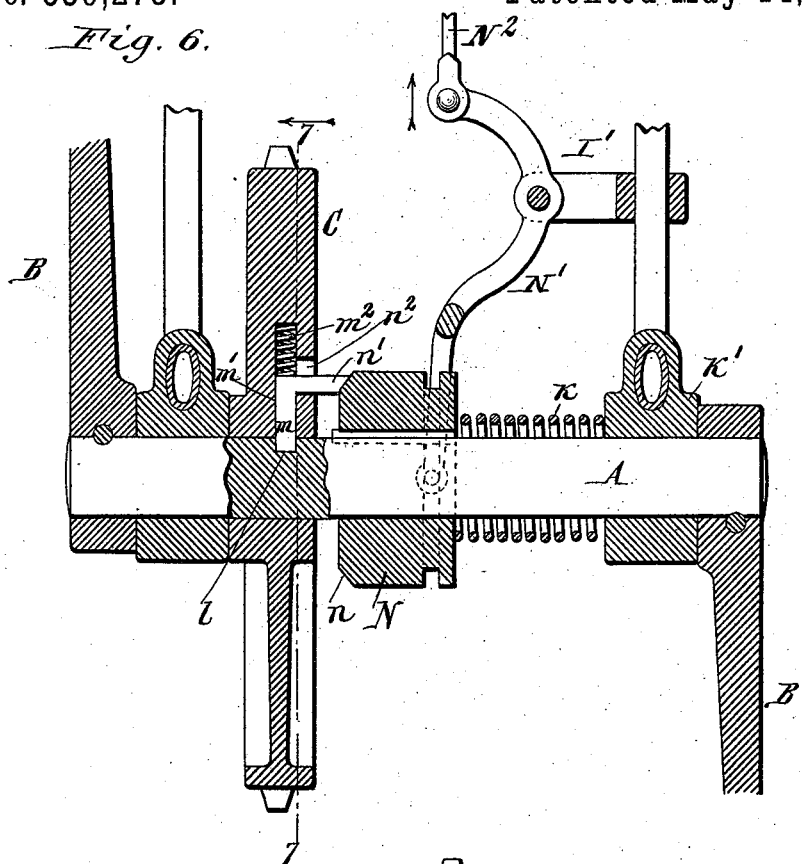
Figure 7:
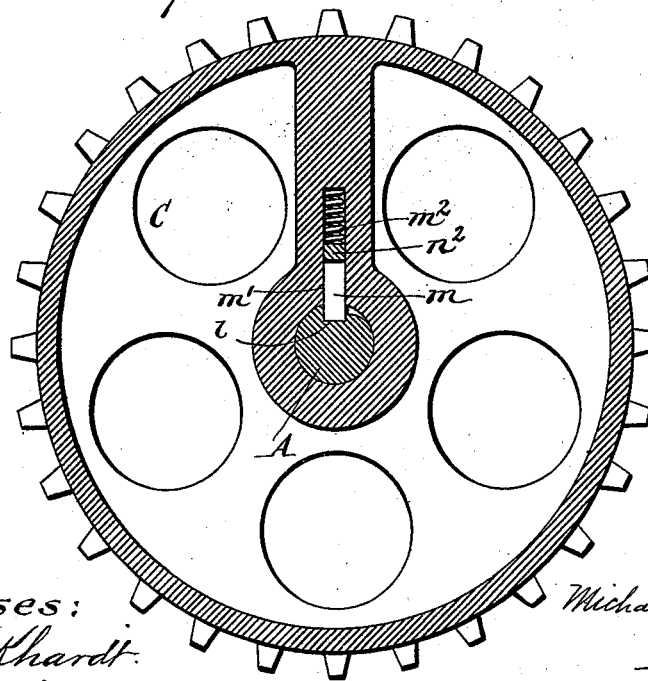

In the accompanying drawings, consisting of three sheets, Figure 1 is a sectional elevation of the crank-shaft and adjacent parts of a bicycle provided with my improved clutch. Fig. 2 is a cross-section thereof in line 2 2, Fig. 1. Fig. 3 is a top plan view of the shifting device of the clutch. Fig. 4 is a cross-section of said shifting device in line 4 4, Fig. 1. Fig. 5 is a fragmentary cross-section of the crank-shaft and the sprocket-wheel on an enlarged scale. Fig. 6 is a sectional elevation showing a modified construction of the clutch. Fig. 7 is a cross-section in line 7 7, Fig. 6. Fig. 8 is a sectional elevation of another modification of the clutch. Fig. 9 is a detached elevation of the sprocket-wheel mounted on the crank-shaft of said modification. Fig. 10 is a face view of the clutch-collar thereof. Figs. 11 and 12 are fragmentary cross-sections of the sprocket-wheel, showing different positions of the clutch-collar, the plane of both sections being in line 11 12, Fig. 8.

Like letters of reference refer to like parts in the several figures.

Referring to the construction shown in Figs. 1 to 5, A represents the horizontal crank shaft of the bicycle, which is hollow, and B the pedal cranks secured to the ends thereof.

C is the sprocket wheel which is capable of turning on the crank shaft and from which motion is transmitted to the rear or driving axle of the machine by the usual sprocket chain, which latter is not shown in the drawings.

$d$ is a catch or clutch tooth attached to the crank shaft and adapted to engage in a radial notch or recess $e$ formed in the bore of the sprocket wheel, so as to hold the wheel against turning on the crank shaft and compel the latter to rotate with the wheel. This clutch tooth is adapted to recede into a longitudinal slot $f$ formed in the hollow crank shaft and is arranged upon the free end of a flat spring $d'$ which is secured at its opposite end to the surface of the crank shaft. The outer edge of the slot $f$ is beveled, as shown in Fig. 1, to permit the clutch tooth to move into the slot, flush with the surface of the shaft, so as to release the sprocket wheel and allow it to turn loosely on the shaft. The spring $d'$ tends to retain the clutch tooth in engagement with the notch of the sprocket wheel and thus keeps the cranks in gear with the driving axle of the machine.

G represents a releasing device for withdrawing the clutch tooth from the notch of the sprocket wheel and throwing the latter out of gear with the crank shaft. The releasing device shown in the drawings consists of a cylindrical block or eccentric arranged to turn in the hollow crank shaft and having at its outer end an eccentric pin or projection $g$ with which the clutch tooth is connected by a link $g'$, so that upon turning the eccentric in the proper direction, the clutch tooth is disconnected from the sprocket wheel and the latter permitted to turn freely without affecting the crank shaft, while upon turning the eccentric in the opposite direction it releases the clutch tooth and allows the spring of the latter to interlock the tooth with the notch of the sprocket wheel.

The releasing eccentric is operated by a cam sleeve H sliding lengthwise upon the crank shaft and having an oblique slot $h$ in which engages a pin $h'$ secured to the eccentric, so that upon shifting the cam sleeve toward or from the sprocket wheel, the eccentric is turned accordingly. The cam sleeve is shifted by means of an upright lever I, pivoted to a bracket I' of the main frame, and having at its lower end a fork provided with inwardly projecting pins $i$ which enter a groove $i'$, surrounding the cam sleeve.

J is an actuating rod extending upward from the upper arm of this shifting lever and terminating in convenient reach of the rider.

$k$ is a spiral spring which surrounds the crank shaft between the inner end of the cam sleeve and the adjacent shaft bearing $k'$ and which presses the cam sleeve outward, so as to allow the clutch tooth to remain interlocked with the sprocket wheel. Upon pushing the actuating rod J downward, the cam sleeve is moved away from the sprocket wheel, against the pressure of the spring $k$, thereby throwing the crank shaft out of gear with the sprocket wheel; and upon releasing this actuating rod, the crank shaft is again thrown into gear with the sprocket wheel.

Under the comparatively high speed of the driving sprocket wheel in coasting or descending a hill, the sudden interlocking of the clutch tooth with the notch of the sprocket wheel would produce an annoying jar to the rider and considerable rack or strain upon the machine, and in order to throw the crank shaft into gear with as slight a shock as possible, the clutching devices are so devised that even though the clutch-tooth be released when the machine is running at a considerable speed, the tooth will not be allowed to interlock with the notch of the sprocket wheel until the machine runs at a normal or comparatively slow speed at which the coupling of the crank shaft and the sprocket wheel is accompanied with little jar. For this purpose, the front or leading side of the locking notch in the sprocket wheel is made abrupt, while its rear or trailing side is beveled or inclined from the open end of the notch to about half its depth, as shown at $e'$ in Fig. 5 and the remaining or inner portion thereof is made abrupt. The clutch tooth is straight on both sides, so that when it is seated in the bottom of the locking notch it is confined against movement in both directions and compels the sprocket wheel to turn backward as well as forward with the crank shaft. By this construction of the clutch tooth and notch, when the clutch is released while the bicycle is still running at a considerable speed, the clutch tooth, instead of immediately entering the notch, strikes the beveled outer portion of its trailing side, whereby the tooth is repeatedly tripped outward and its entrance into the notch restrained until the speed of the sprocket wheel diminishes sufficiently to allow the spring of the tooth to press the latter into the notch. In order to prevent the tooth from interlocking with such notch until the speed of the machine diminishes to the normal speed, the spring is tensioned accordingly. The clutch, even after being released, is therefore not allowed to couple the crank shaft with the sprocket wheel until the speed of the machine is reduced to a degree at which the jar incident to effecting the coupling is comparatively slight.

In the modified construction of the clutch shown in Figs. 6 and 7, the crank shaft is solid and the arrangement of the clutch-tooth or catch and its locking notch is reversed, the notch being formed in the shaft, as shown at $l$, and the tooth or catch on the sprocket wheel.

In this construction, the catch consists of a spring bolt $m$ which slides in a radial socket $m'$, opening into the bore of the wheel and which is held in engagement with the notch of the shaft by a spring $m^2$, arranged in said socket and bearing against the rear end of the bolt. This spring bolt is withdrawn from the notch of the shaft, to uncouple the sprocket wheel, by a sliding collar N mounted upon the shaft and having a beveled face $n$ which engages with the inclined outer end of a releasing arm $n'$, projecting laterally from the sliding bolt and passing through a radial slot $n^2$, formed in the sprocket wheel. The sliding collar N is shifted by a forked lever N' and an actuating rod $N^2$, as in the first described construction, but, instead of pushing the actuating rod downward to throw the shaft out of gear with the sprocket wheel, the same is pulled upward, whereby the beveled face of the sliding collar, acting upon the inclined arm of the sliding bolt, draws the latter out of engagement with the notch of the shaft. The trailing side of this notch is beveled at its outer portion and abrupt at its inner portion, similar to the notch of the sprocket wheel in the previous construction, whereby the same effect, as in the latter construction, is produced.

In the modification shown in Figs. 8 to 12, the sprocket wheel is provided in its inner side with one or more locking notches, instead of in its bore, and the clutch teeth or catches are formed on a clutch collar O, splined to the solid crank shaft, so as to permit it to slide toward and from the sprocket wheel, but compel the crank shaft to turn with it. $p$ represents the straight-sided teeth formed on the outer face of the clutch collar, and $q$ the notches formed in the adjacent side of the sprocket wheel, in which such teeth engage. The trailing side of each of these notches is beveled from the outer end of the notch to about one-half its depth, while the remainder of such side is abrupt, as in the construction previously described. $r$ is the spring whereby the clutch collar is pressed toward the sprocket wheel, for keeping the latter in gear with the crank shaft. $r'$ is the forked releasing lever of the clutch collar, and $r^2$ the actuating rod, which in this case is pushed downward for throwing the crank shaft out of gear.

While my improved clutch is particularly serviceable in connection with velocipedes for disconnecting the cranks from the driving axle of the machine, it may be applied to other machines or devices in which it is desirable to couple rotary parts without undue jar.

I claim as my invention—

1. The combination with a shaft or axle and a wheel mounted thereon, of a clutch tooth or catch connected with one of said parts, and a locking notch, adapted to receive said tooth, arranged in the other part and having one of its sides abrupt and its opposite side partly beveled and partly abrupt, substantially as set forth.

2. The combination with a shaft or axle and a movable clutch tooth or catch connected therewith, of a wheel mounted on said shaft and provided with a locking notch having its front side abrupt and the inner portion of its rear side abrupt and the outer portion thereof beveled, and means for retracting said clutch tooth or catch from said notch, substantially as set forth.

3. The combination with a shaft or axle and a movable clutch tooth or catch connected therewith, of a wheel mounted on said shaft and provided with a locking notch having its front side abrupt and the inner portion of its rear side abrupt and the outer portion thereof beveled, a spring for retaining the clutch tooth in engagement with said notch, and a releasing device for withdrawing it from said notch, substantially as set forth.

4. The combination with a slotted hollow shaft or axle, of a spring attached thereto and carrying a clutch tooth adapted to recede into said slot, a rotary eccentric arranged in said shaft, connected with said tooth and having a shifting pin, a sleeve sliding upon said shaft and having an oblique slot which receives said pin, and a wheel mounted on said shaft and having a locking notch which receives said clutch tooth, substantially as set forth.

5. The combination with a slotted hollow shaft or axle, of a spring attached thereto and carrying a clutch tooth adapted to recede into said slot, a rotary eccentric arranged in said shaft and connected with said clutch tooth, a cam sleeve for turning said eccentric, a spring for shifting the cam sleeve in the proper direction to retain the clutch tooth in engagement with the notch of the wheel, and a retracting lever connected with said cam sleeve, substantially as set forth.

Witness my hand this 25th day of March, 1893.

MICHAEL KELLY.

Witnesses:
 THEO. L. POPP,
 CHAS. F. BURKHARDT.